United States Patent
Terashima et al.

(10) Patent No.: US 6,496,527 B1
(45) Date of Patent: Dec. 17, 2002

(54) ULTRAVIOLET LASER APPARATUS AND GAS FOR ULTRAVIOLET LASER

(75) Inventors: Katsutomo Terashima, Oyama (JP); Osamu Wakabayashi, Hiratsuka (JP); Akira Sumitani, Isehara (JP)

(73) Assignee: Komatsu, Ltd., Tokyo (JP)

( * ) Notice: Subject to any disclaimer, the term of this patent is extended or adjusted under 35 U.S.C. 154(b) by 36 days.

(21) Appl. No.: 09/669,686

(22) Filed: Sep. 26, 2000

(30) Foreign Application Priority Data

Sep. 27, 1999 (JP) ................................. 272496

(51) Int. Cl.⁷ ............................................. H01S 3/223
(52) U.S. Cl. ......................................................... 372/60
(58) Field of Search ........................... 372/55, 57, 58, 372/59, 60

(56) References Cited

U.S. PATENT DOCUMENTS

| | | | |
|---|---|---|---|
| 3,829,551 A | 8/1974 | Stein | 423/210 |
| 5,090,020 A | * 2/1992 | Bedwell | 372/59 |
| 5,307,364 A | 4/1994 | Turner | 372/60 |
| 5,450,436 A | 9/1995 | Mizoguchi et al. | 372/59 |
| 5,463,650 A | 10/1995 | Ito et al. | 372/57 |
| 5,642,374 A | 6/1997 | Wakabayashi et al. | 372/57 |
| 6,014,398 A | * 1/2000 | Hofmann et al. | 372/60 |
| 6,018,537 A | * 1/2000 | Hofmann et al. | 372/25 |
| 6,188,710 B1 | * 2/2001 | Besacuccele et al. | 372/60 |

OTHER PUBLICATIONS

R. S. Taylor et al., Transmission Properties of Spark Preionization Radiation in Rare-gas Halide Laser Gas Mixes, IEEE Journal of Quantum Electronics, Dec. 1995. IEEE, USA, vol. 31, No. 12, pp. 2195–2207.

* cited by examiner

Primary Examiner—Paul Ip
Assistant Examiner—Jeffrey N Zahn
(74) Attorney, Agent, or Firm—Varndell & Varndell, PLLC

(57) ABSTRACT

Xenon gas is added from a small-sized Xe gas cylinder (15) to the excimer laser gas inside a chamber (10) supplied from an Ar/Ne gas cylinder (13) and an Ar/Ne/$F_2$ gas cylinder (14), the xenon gas proportion is detected by an Xe gas sensor (16), and the supply of the xenon gas supplied to the chamber (10) from the Xe gas cylinder (15) is controlled by a gas controller (18).

9 Claims, 11 Drawing Sheets

ULTRAVIOLET LASER APPARATUS AND GAS FOR ULTRAVIOLET LASER

BACKGROUND OF THE INVENTION

1. Field of the Invention

This invention relates to an ultraviolet laser apparatus that seals a gas for ultraviolet laser in a chamber and excites the gas for ultraviolet laser by oscillating pulses in the chamber to oscillate a pulsed laser, and to a gas for ultraviolet laser, and particularly to an ultraviolet laser apparatus and a gas for ultraviolet laser to which xenon gas is added to improve laser output in terms of the burst and spike phenomena.

2. Description of the Related Art

Conventionally, in aligners, which use an excimer laser device as a light source, IC chips are exposed on a semiconductor wafer by alternately repeating the exposure and the movement of a stage. To that end, conventional ultraviolet laser apparatuses perform burst operations which repeat a consecutive pulse oscillation operation that consecutively oscillates a prescribed number of laser beam pulses and an oscillation stop for stopping the pulse oscillation for a prescribed time interval.

FIG. 6(a) is a diagram that plots the relationship between energy and burst number when burst operations are conducted with a conventional excimer laser apparatus. As plotted in this diagram, in burst operations with the excimer laser apparatus, the initial energy is high, and thereafter the energy gradually declines. This characteristic is hereinafter called the "burst characteristic."

FIG. 6(b) is a diagram that plots the relationship between pulses and energy in each burst. As plotted in this diagram, initially in the consecutive pulse oscillation operation, comparatively high energy is obtained, and thereafter the pulse energy gradually declines. This characteristic is hereinafter called the "spike characteristic."

Thus, when burst operations are conducted using a conventional excimer laser apparatus, such a burst characteristic and spike characteristic will ordinarily occur.

However, if a burst characteristic appears in the laser output oscillated by an excimer laser apparatus, a problem arises in that the exposure amount varies due to fluctuation in the energy of each burst.

Furthermore, if a spike characteristic appears in such laser output, the exposure amount precision will decline further, which is problematic because of the necessity then of conducting complex discharge voltage control.

In other words, conventionally, complex discharge voltage control has been necessitated because of measures taken to prevent initial energy rise due to the spike phenomenon, varying the discharge voltage pulse by pulse, so as to make the discharge voltage (charging voltage) small in the first pulse of the consecutive pulse oscillation in the burst mode, and then make the discharge voltage gradually larger in pulses thereafter.

In view of these facts, an extremely important issue is that of how to efficiently cancel out burst and spike characteristics in laser outputs when an ultraviolet laser apparatus is operated in burst mode.

Art for adding xenon gas into elemental neon gas is disclosed in "Transmission Properties of Spark Preionization Radiation in Rare-Gas Halide Laser Gas Mixes" appearing in IEEE JOURNAL OF ELECTRONICS, Vol. 31, No. 12, December, 1995, pp 2195–2207. However, this conventional technology is nothing more than the technology for making spark pre-ionization intensity large, and is not the technology for canceling burst and spike characteristics in ultraviolet laser output.

SUMMARY OF THE INVENTION

Accordingly, an object of the present invention is to efficiently improve ultraviolet laser outputs in terms of burst and spike characteristics, and to make it possible to enhance and stabilize laser outputs.

To achieve the object stated above, an invention relating to a first aspect of the invention is an ultraviolet laser apparatus for sealing a gas for ultraviolet laser in a chamber, and exciting that gas for ultraviolet laser by effecting pulse discharges in that chamber to oscillate a pulsed laser, wherein a prescribed quantity of xenon gas at a prescribed concentration is supplied to the gas for ultraviolet laser in the chamber, and the burst phenomenon and spike phenomenon appearing in the ultraviolet laser output are reduced.

Thus, with the first aspect of the invention, a prescribed quantity of xenon gas at a prescribed concentration is supplied to the gas for ultraviolet laser in the chamber, and the burst and spike phenomena appearing in the ultraviolet laser output are cancelled out, wherefore the ultraviolet laser output can be enhanced, and that output stabilized, simply, without recourse to complex control.

An invention relating to a second aspect of the invention comprises a xenon gas cylinder wherein is sealed xenon gas for supply to the inside of the chamber, detection means for detecting the concentration of the xenon gas added to the gas for ultraviolet laser inside the chamber, and control means for controlling the quantity of the xenon gas sealed in the xenon gas cylinder that is supplied to the chamber, based on the xenon gas concentration detected by the detection means.

Thus, with the second aspect of the invention, provision is made for detecting the concentration of the xenon gas added to the gas for ultraviolet laser inside the chamber, and for controlling the quantity of xenon gas sealed in the xenon gas cylinder that is supplied to the chamber, wherefore, by merely providing a conventional ultraviolet laser apparatus with a xenon gas cylinder, detection means, and control means, the ultraviolet laser output can easily be enhanced and that output stabilized.

An invention relating to a third aspect of the invention is a gas for ultraviolet laser used in an ultraviolet laser apparatus that excites gas for ultraviolet laser sealed inside a chamber to oscillate a pulsed laser, which gas for ultraviolet laser at least contains xenon gas of a prescribed concentration.

Thus, with the third aspect of the invention, the gas for ultraviolet laser is configured so as to at least contain, besides a halogen gas, xenon gas of a prescribed concentration. Therefore, merely by supplying this gas for ultraviolet laser to the inside of the chamber, the ultraviolet laser output can easily be enhanced and that output can also be stabilized.

An invention relating to a fourth aspect of the invention is the gas for ultraviolet laser described above, containing xenon gas at 200 ppm or lower.

An invention relating to a fifth aspect of the invention comprises xenon gas adsorption means for causing xenon gas to be adsorbed in the chamber wherein xenon gas has not been adsorbed on the surface of the walls therein, and verification means for verifying that the concentration of xenon gas inside a chamber reaches a prescribed concentration when the xenon gas absorption means have caused xenon gas to be adsorbed on the surface of the walls inside that chamber, and xenon gas has been supplied in such quantity that the concentration of the xenon gas inside the chamber will reach the prescribed concentration.

Thus, with the fifth aspect of the invention, sufficient xenon gas is caused to be adsorbed on the surface of the walls inside the chamber, beforehand, in cases where use is made of a chamber having no xenon gas adhering to the surface of the walls therein, such as a chamber newly fabricated and assembled, for example, or reassembled after maintenance treatments such as decomposition and cleaning after being used for a laser. Following thereupon, when xenon gas is supplied inside the chamber in sufficient quantity that the prescribed concentration will be attained, this xenon gas is added to the laser gas without adsorption to the surface of the walls inside the chamber. Hence the concentration of the xenon gas inside the chamber will reach the prescribed concentration. As a consequence, even if a newly assembled or reassembled chamber is used, the concentration of the xenon gas at the initial stage of use will reach the prescribed concentration, and, when conducting burst operations, the burst phenomenon and spike phenomenon appearing in the ultraviolet laser output can be reduced.

In an invention relating to a sixth aspect of the invention, the prescribed concentration for the xenon gas inside the chamber exceeds 0 ppm but is no greater than 200 ppm.

In an invention relating to a seventh aspect of the invention, the xenon gas absorption means comprises xenon gas supply means for supplying xenon gas to the inside of the chamber, the verification means comprises concentration measurement means for measuring the concentration of the xenon gas inside the chamber, and the supply of xenon gas by the xenon gas supply means is stopped when xenon gas has been supplied to the inside of the chamber by the xenon gas supply means and the concentration of the xenon gas inside the chamber as measured by the concentration measurement means has reached a prescribed concentration.

Thus, with the seventh aspect of the invention, xenon gas is supplied beforehand to the inside of a chamber wherein xenon gas does not adhere to the surface of the walls therein. When the concentration of the xenon gas inside the chamber has been measured and the xenon gas concentration has reached the prescribed concentration, the supply of xenon gas to the inside of the chamber is stopped. Following thereupon, when a sufficient quantity of xenon gas is supplied to the inside of the chamber so that the prescribed concentration is attained, that xenon gas is added to the laser gas without being adsorbed to the surface of the walls inside the chamber. Hence the concentration of the xenon gas inside the chamber will reach the prescribed concentration. As a consequence, even when a newly assembled chamber or reassembled chamber is used, the xenon gas concentration will reach the prescribed concentration in the initial state of use, whereupon, when burst operations are conducted, the burst phenomenon and spike phenomenon appearing in the ultraviolet laser output can be reduced.

In an eighth aspect of the invention, the xenon gas ad sorption means comprises xenon gas supply means for supplying xenon gas to the inside of the chamber, the verification means comprises energy measurement means for measuring the laser energy value when laser pulses are oscillated, xenon gas is supplied to the inside of the chamber by the xenon gas supply means and laser pulses are oscillated, the laser energy value after a prescribed number of pulses has been oscillated as measured by the energy measurement means is measured, and the supply of xenon gas by the xenon gas supply means is stopped when the laser energy value after the prescribed number of pulses has been oscillated has ceased to decrease.

Thus, with the eighth aspect of the invention, xenon gas is supplied beforehand to the inside of a chamber wherein xenon gas is not adsorbed on the surface of the walls therein. Laser pulses are oscillated, and, when it has been detected, by a measurement device, that the laser energy value in a prescribed number of pulses has ceased to decrease, the supply of the xenon gas by the xenon gas supply means is stopped. Following thereupon, when a sufficient quantity of xenon gas is supplied to the inside of the chamber so that the prescribed concentration is attained, that xenon gas is added to the laser gas without being adsorbed on the surface of the walls inside the chamber. Hence the concentration of the xenon gas inside the chamber will reach the prescribed concentration. As a consequence, even when a newly assembled chamber or reassembled chamber is used, the xenon gas concentration will reach the prescribed concentration in the initial state of use, whereupon, when burst operations are conducted, the burst phenomenon and spike phenomenon appearing in the ultraviolet laser output can be reduced. Based on the invention relating to claim 8, moreover, xenon gas concentration can be accurately measured without providing a concentration detection device.

In a ninth aspect of the invention, the xenon gas adsorption means comprises xenon gas supply means for supplying xenon gas to the inside of the chamber, the verification means comprises voltage measurement means for measuring the discharge voltage value when laser pulses are oscillated, xenon gas is supplied to the inside of the chamber by the xenon gas supply means and laser pulses are oscillated, the discharge voltage value after a prescribed number of pulses has been oscillated as measured by the voltage measurement means is measured, and, when the discharge voltage value after the prescribed number of pulses has been oscillated has ceased to increase, the supply of xenon gas by the xenon gas supply means is stopped.

With the ninth aspect of the invention, xenon gas is supplied beforehand to the inside of a chamber wherein xenon gas does not adhere to the surface of the walls therein. Laser pulses are oscillated so that the laser output light energy is made constant. When it has been detected by a measurement device that the discharge voltage value in a prescribed number of pulses has ceased to increase, the supply of xenon gas to the inside of the chamber is stopped. Following thereupon, when a sufficient quantity of xenon gas is supplied to the inside of the chamber so that the prescribed concentration is attained, that xenon gas is added to the laser gas without being adsorbed on the surface of the walls inside the chamber. Hence the concentration of the xenon gas inside the chamber will reach the prescribed concentration. As a consequence, even when a newly assembled chamber or reassembled chamber is used, the xenon gas concentration will reach the prescribed concentration in the initial state of use, whereupon, when burst operations are conducted, the burst phenomenon and spike phenomenon appearing in the ultraviolet laser output can be reduced. Based on the invention relating to claim 9, moreover, xenon gas concentration can be accurately measured without providing a concentration detection device.

In a tenth aspect of the invention, the xenon gas adsorption means comprises flushing means for flushing the inside of the chamber with xenon gas, the verification means comprises supply means for supplying prescribed quantities of xenon gas to the inside of the chamber and measurement means for measuring the concentration of the xenon gas inside the chamber, and, when a prescribed quantity of xenon gas has been supplied by the supply means, flushing is repeatedly performed by the flushing means until the concentration of the xenon gas inside the chamber reaches the prescribed concentration.

Based on the tenth aspect of the invention, the inside of a chamber wherein xenon gas is not adsorbed to the surface of the walls therein is flushed with xenon gas. After that, a sufficient quantity of xenon gas is supplied to the inside of the chamber so that the prescribed concentration is attained. If the xenon gas concentration inside the chamber does not reach the prescribed concentration, flushing with xenon gas is repeated. When the xenon gas concentration inside the chamber does reach the prescribed concentration, flushing is terminated. Hence the xenon gas concentration inside the chamber will reach the prescribed concentration. As a consequence, even when a newly assembled or reassembled chamber is used, the xenon gas concentration will attain the prescribed concentration in the initial stage of use, and, when burst operations are conducted, the burst phenomenon and spike phenomenon appearing in the ultraviolet laser output can be reduced. Furthermore, if xenon gas of high concentration is introduced during flushing, the time required for causing xenon gas to be adsorbed to the surface of the walls inside the chamber can be shortened.

In an invention relating to claim 11, flushing by the flushing means is performed while or before and/or after the surface of the walls inside the chamber is subjected to a gas for ultraviolet laser passivation process.

DESCRIPTION OF THE PREFERRED EMBODIMENTS

Embodiments of the present invention are now described with reference to the drawings. In a first embodiment described below, a case is considered wherein the present invention is applied to an excimer laser apparatus, and in a second embodiment described further below, a case is considered wherein the present invention is applied to an $F_2$ laser.

(First Embodiment)

Figure 1:
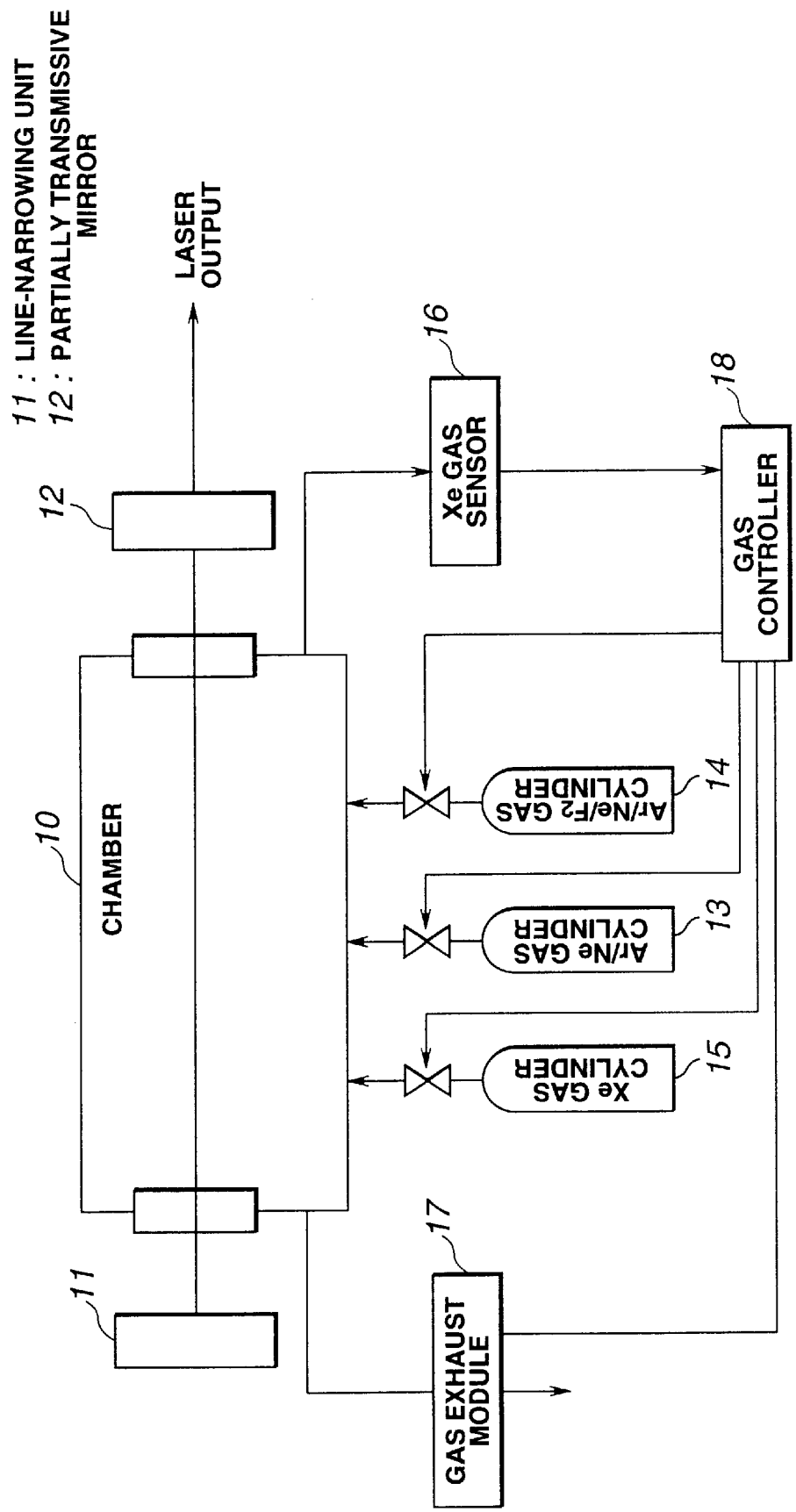
FIG. 1 is a block diagram representing the configuration of an excimer laser apparatus used in a first embodiment.

FIG. 1 is a block diagram of the configuration of an excimer laser apparatus used in the first embodiment.

The excimer laser apparatus diagrammed in FIG. 1 is an apparatus for oscillating laser pulses by sealing inside a chamber 10 an excimer laser gas comprising a buffer gas of Ne or the like, a rare gas of Ar or Kr, a halogen gas of $F_2$ or the like, and xenon (Xe) gas, and exciting that excimer laser gas by discharges between discharge electrodes.

What is characteristic of the excimer laser apparatus considered here is that it does not form the gas for excimer laser use only of a rare gas and a halogen gas, but also adds xenon gas to that excimer laser gas. The reason for adding that xenon gas to the excimer laser gas is that thereby the burst phenomenon and spike phenomenon that appear in excimer laser outputs might be cancelled out.

The excimer laser apparatus diagrammed in FIG. 1 has a chamber 10, a line-narrowing unit 11, a partially transmissive mirror 12, an Ar/Ne gas cylinder 13, an Ar/Ne/$F_2$ gas cylinder 14, an Xe gas cylinder 15, an Xe gas sensor 16, a gas exhaust module 17, and a gas controller 18.

The chamber 10 is a sealing medium for sealing an excimer laser gas wherein are mixed Ne gas, Ar gas, $F_2$ gas, and Xe gas. The line-narrowing unit 11 is a unit for narrowing the linewidth of the pulsed light emitted, formed by a prism beam expander and/or grating or the like (which are not shown). The partially transmissive mirror 12 is a mirror that transmissively outputs only a portion of the laser light oscillated.

The Ar/Ne gas cylinder 13 is a gas cylinder for storing an argon and neon gas mixture. The Ar/Ne/$F_2$ gas cylinder 14 is a gas cylinder for storing an argon, neon, and fluorine gas mixture. And the Xe gas cylinder 15 is a small gas cylinder for storing xenon gas.

The Xe gas sensor 16 is a gas sensor for detecting the proportions of xenon gas and the like contained in the excimer laser gas sealed inside the chamber 10. The gas exhaust module 17 is a module for exhausting the excimer laser gas inside the chamber 10 to the outside.

The gas controller 18 is a controller for controlling the supply of Ar/Ne gas from the Ar/Ne gas cylinder 13 to the chamber 10, the supply of Ar/Ne/$F_2$ gas from the Ar/Ne/$F_2$ gas cylinder 14 to the chamber 10, the supply of xenon gas from the Xe gas cylinder 15 to the chamber 10, and the excimer laser gas exhaust effected by the gas exhaust module 17, based on the detection outputs of the Xe gas sensor 16.

This excimer laser apparatus is thus configured such that a small Xe gas cylinder 15 is added to a conventional excimer laser apparatus, the xenon gas proportion is detected by an Xe gas sensor 16, and the supply of xenon gas from the Xe gas cylinder 15 to the chamber 10 is controlled by a gas controller 18.

Next, the burst and spike characteristics are described for the case where such an excimer laser gas that has xenon gas added thereto is used.

Figure 2A:
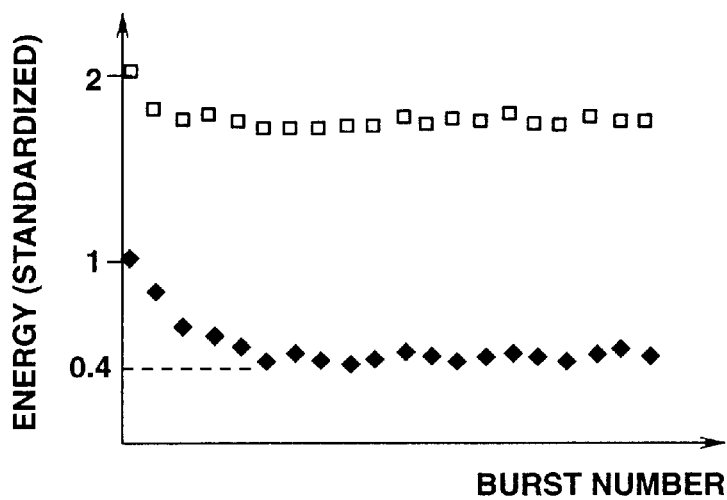
FIGS. 2(a) and 2(b) are diagrams representing one example of burst and spike characteristics respectively when the excimer laser gas used has xenon gas added thereto.
Figure 2B:
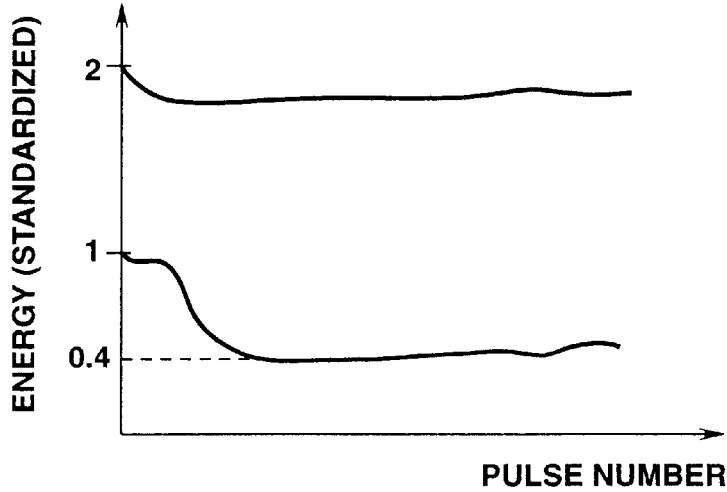

FIGS. 2(a) and 2(b) are a pair of diagrams representing one example of burst and spike characteristics respectively when the excimer laser gas used has xenon gas added thereto. In the case represented here, the xenon gas concentration of the xenon gas added to the excimer laser gas is 10 ppm.

As plotted in FIG. 2(a), when the energy value of the initial burst when no xenon gas is added is taken as 1, the burst characteristic exhibited is that the energy value diminishes as the number of bursts increases, converging eventually at about 40% (0.4) the initial value.

In contrast thereto, when xenon gas is added to a concentration of 10 ppm, the number of bursts after which the energy value converges becomes smaller, and the [amount by which] the energy declines as the number of bursts increases is also small. Furthermore, the energy value of each burst, in the case where xenon gas has been added to 10 ppm, is far greater than when the xenon gas has not been added.

Thus the burst characteristic is sharply improved when xenon gas is added to 10 ppm over what it is when the xenon gas is not added.

As plotted in FIG. 2(b), meanwhile, when the energy value of the initial pulse when no xenon gas is added is made 1, a spike characteristic is exhibited such that the energy value becomes smaller as the number of pulses increases, eventually converging at about 40% (0.4) the initial value. For that reason, in actual practice, the pulses for the spike portion [that exists] until the pulse oscillation advances and the energy converges cannot be used.

In contrast thereto, when xenon gas has been added to a concentration of 10 ppm, the spike portion is almost completely cancelled out, the energy value converges extremely quickly, and the energy value deviation (3σ) is also sharply improved. Also, the energy value of each pulse, when xenon gas has been added to 10 ppm, is far higher than when the xenon gas is not added.

Thus the spike characteristic is significantly improved when xenon gas is added to 10 ppm over what it is when xenon gas is not added.

Next are explained the correlations between the quantity of xenon added to the excimer laser gas sealed in the chamber 10 diagrammed in FIG. 1, the laser output energy value, and the deviation in that value.

Figure 3:
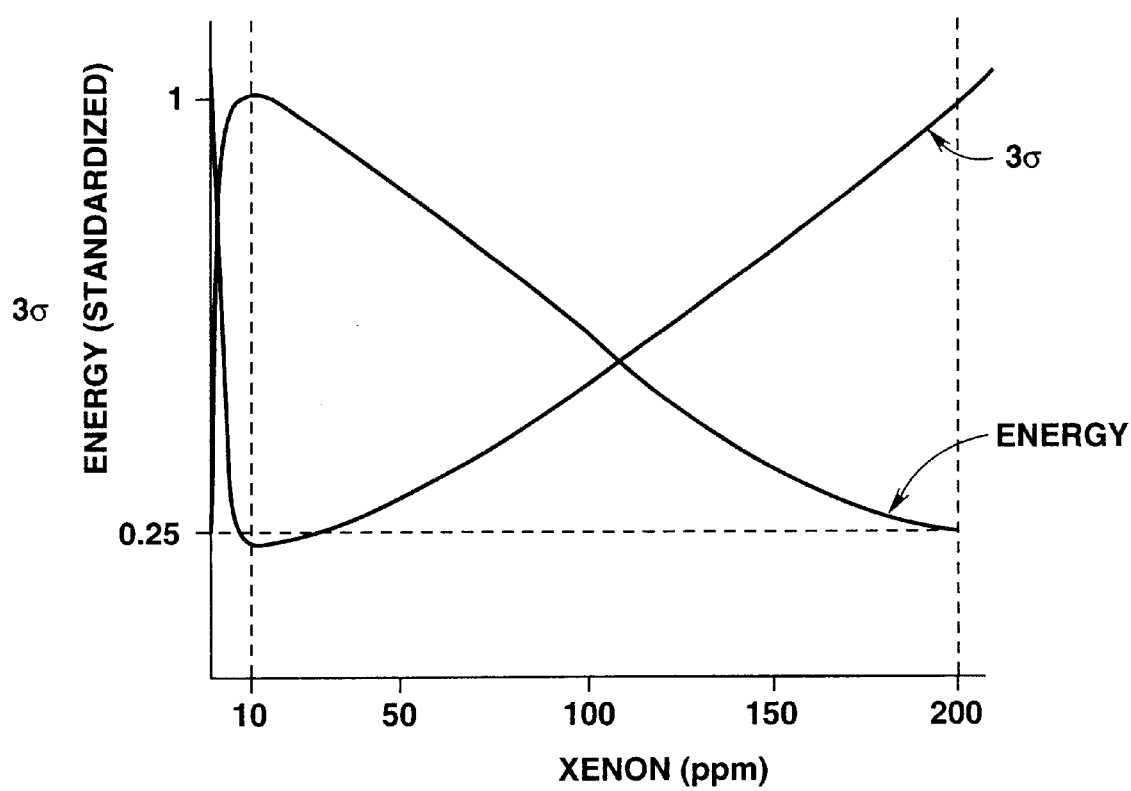
FIG. 3 is a diagram that represents the correlations between the amount of xenon gas added to excimer laser gas sealed in the chamber diagrammed in FIG. 1, the laser output energy value, and the deviation (3σ) therein.

FIG. 3 is a diagram that represents the correlations between the amount of xenon gas added to excimer laser gas sealed in the chamber 10 diagrammed in FIG. 1, the laser output energy value, and the deviation (3σ) therein.

As plotted in FIG. 3, the energy value obtainable when no xenon gas is added is only about 25% of the maximum output when xenon gas is added, but that energy value increases very rapidly when the quantity of xenon gas added is gradually increased (from 0 to 10 ppm).

More specifically, when xenon gas is added in an amount of 0 to 2 ppm, the output energy very rapidly increases, in the range of 2 to 10 ppm the output energy becomes more or less flat, and when the added amount reaches 10 ppm the energy value is maximized. After that, as the amount of xenon gas added is continually increased, the energy value gradually declines.

When the amount of xenon gas added is gradually increased (from 0 to 10 ppm), moreover, the deviation in the energy value (3σ) is reduced, and that energy value deviation is minimized (at approximately 25 percent) when the amount of xenon gas added is approximately 10 ppm. After that, as the amount of xenon gas added is continually increased, the deviation (3σ) increases.

From these facts it is seen that, in terms of energy efficiency and energy stability, efficiency is best when xenon gas is added to approximately 10 ppm or so. It is noted, however, that even when xenon gas is added to 200 ppm or so, the energy values and deviation therein are improved over what they are when no xenon gas is added.

Figure 4:
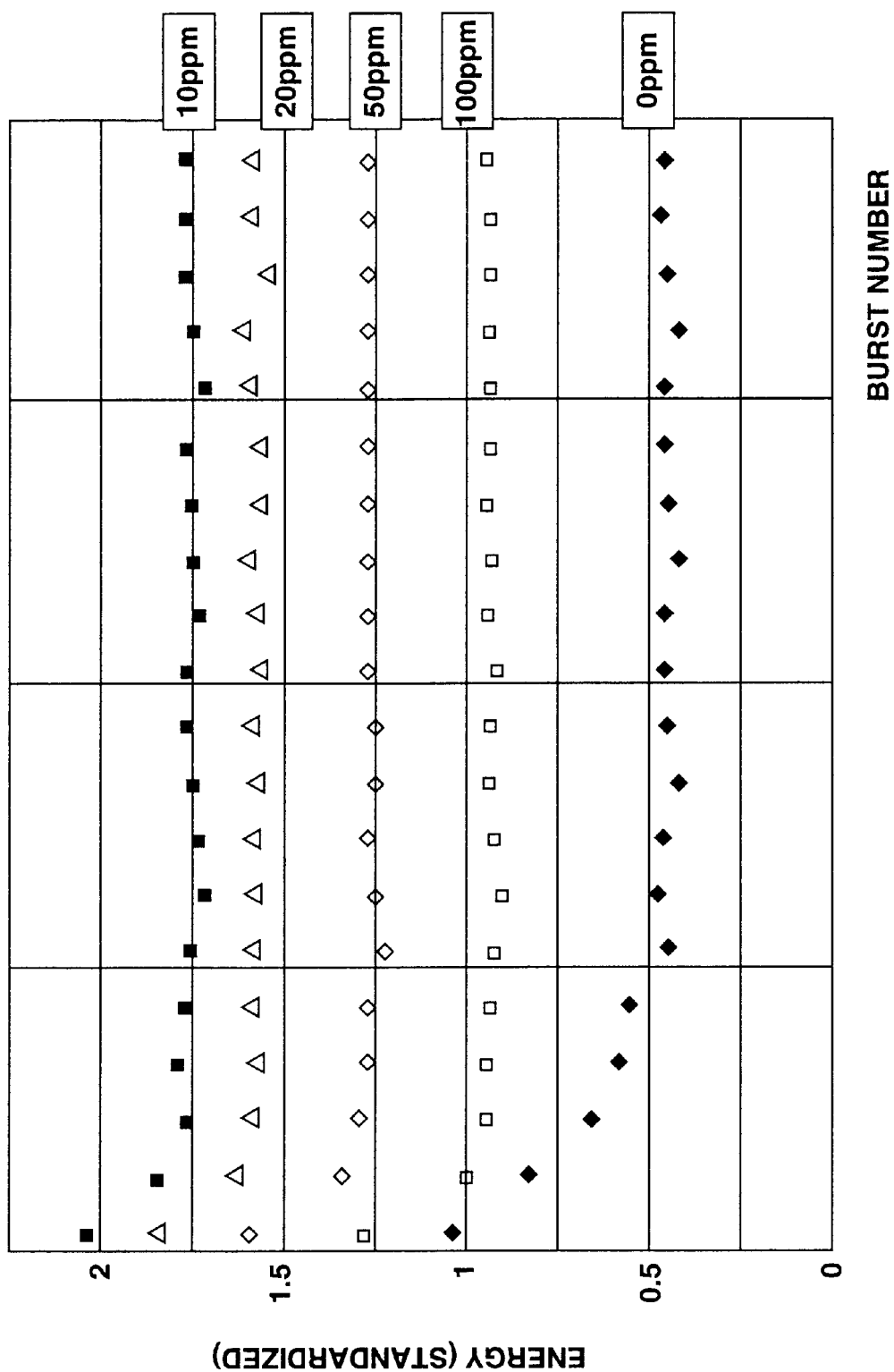
FIG. 4 is a diagram that represents the correlation between the amount of xenon added to excimer laser gas and the burst characteristic.
Figure 5:
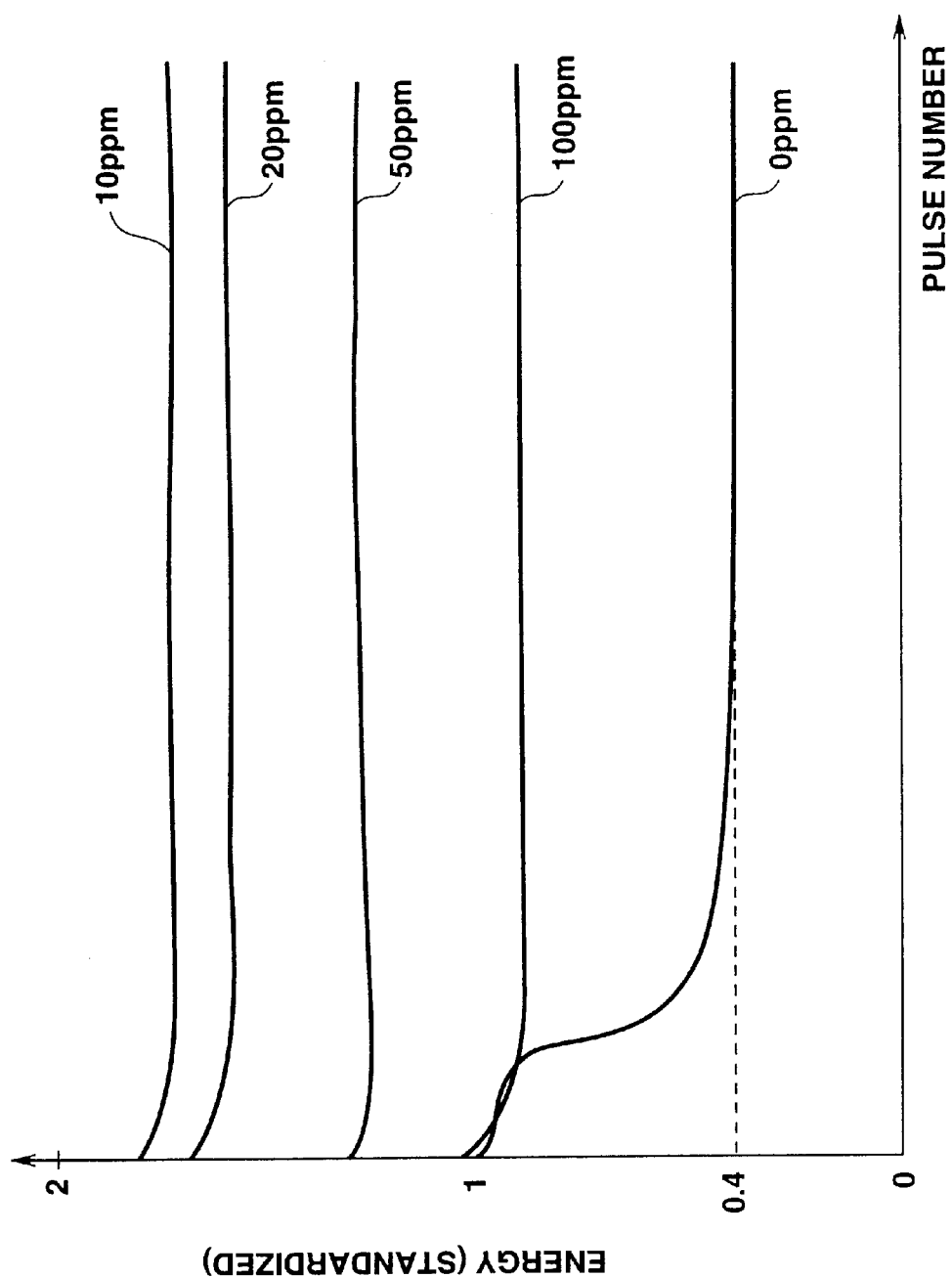
FIG. 5 is a diagram that represents the correlation between the amount of xenon added to excimer laser gas and the spike characteristic.
Figure 6A:
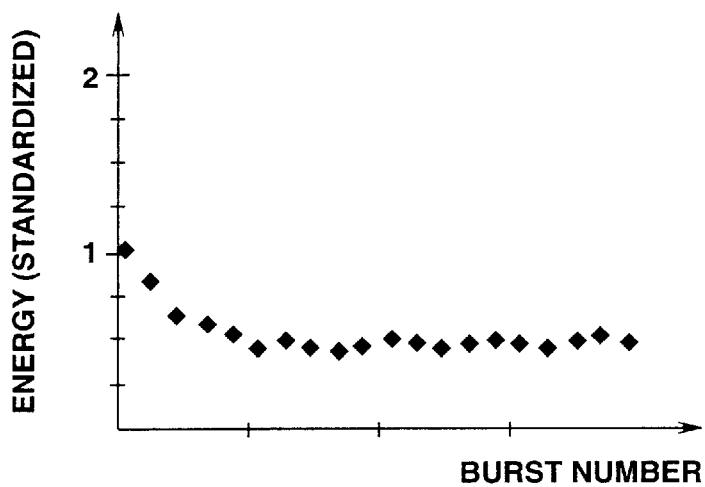
FIGS. 6(a) and 6(b) are diagrams representing the relationship between energy and burst number, etc., when conducting burst operations with a conventional excimer laser apparatus.
Figure 6B:
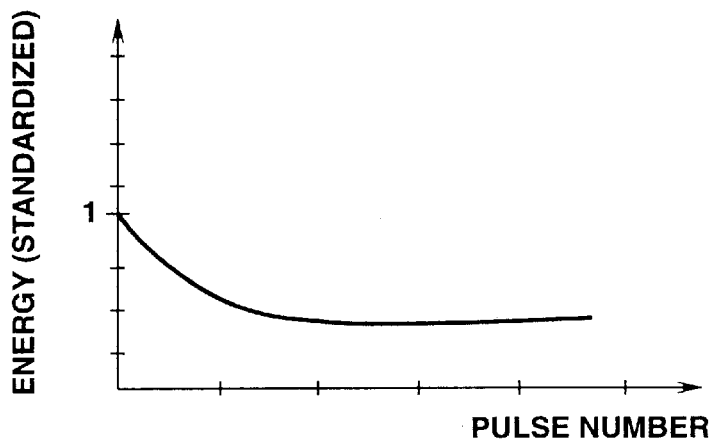

The burst and spike characteristics are next described, with reference to FIG. 4 and FIG. 5, in cases where the amount of xenon gas added to the excimer laser gas sealed in the chamber 10 diagrammed in FIG. 1 is varied.

FIG. 4 is a diagram that plots the correlation between the burst characteristic and the amount of xenon gas added to the excimer laser gas.

As plotted in FIG. 4, in the case where no xenon gas is added (0 ppm), a burst characteristic is exhibited such that, as the number of bursts builds up, the output light energy value gradually declines until it converges at some value. In every case where xenon gas is added, however, to 10 ppm, 20 ppm, 50 ppm, and 100 ppm, the number of bursts before the output energy converges is fewer.

In the case where xenon gas is added to 10 ppm, moreover, the energy value is highest, and the energy value for each burst declines every time the amount of xenon gas added is increased. Nevertheless, even when xenon gas is added to 100 ppm, the energy value of each burst is higher than when no xenon gas is added.

It is seen from these facts that, basically, the burst characteristic is improved by the addition of xenon gas, with an additive amount of approximately 10 ppm being the most efficient.

FIG. 5 is a diagram that represents the correlation between the amount of xenon added to the excimer laser gas and the spike characteristic.

As plotted in FIG. 5, in the case where no xenon gas is added (0 ppm), a spike characteristic is exhibited such that the energy value gradually declines until a prescribed number of pulses is exceeded. In every case where xenon gas is added, however, to 10 ppm, 20 ppm, 50 ppm, and 100 ppm, that spike characteristic is significantly improved.

When xenon gas is added to 10 ppm, moreover, the energy value is the highest, and the pulse energy value declines every time the amount of xenon gas added is increased. Nevertheless, even when xenon gas is added to 100 ppm, the pulse energy value is higher than when no xenon gas is added.

From these facts it is seen that, basically, the spike characteristic is improved by the addition of xenon gas, and an additive amount of approximately 10 ppm is the most efficient.

As has been described in the foregoing, in this first embodiment, the configuration is made such that a small Xe gas cylinder 15 is added to a conventional excimer laser apparatus, the proportion of xenon gas is detected by an Xe gas sensor 16, and the supply of the xenon gas supplied to the chamber 10 from the Xe gas cylinder 15 is controlled by a gas controller 18, wherefore the benefits described below are realized.

The burst phenomenon and spike phenomenon appearing in excimer laser outputs can be reduced.

The excimer laser output can be stabilized in a simple manner without involving complex control.

Excimer laser output can be stabilized using a conventional excimer laser apparatus as the basic configuration.

In this embodiment, furthermore, the Xe gas cylinder 15 is to be added to a conventional excimer laser apparatus, but the present invention is not limited thereto or thereby. It is also possible to seal an excimer laser gas to which xenon gas has been added in a gas cylinder and then supply that excimer laser gas directly to the chamber 10 from that gas cylinder.

In this embodiment, moreover, the case considered is one wherein laser pulses are oscillated by exciting an excimer laser gas by electrical discharges between discharge electrodes, but the present invention is not limited thereto or thereby. The present invention can be applied in cases also where electron beams or microwaves are used to excite the excimer laser gas.

The first embodiment has thus been described to this point.

(Second Embodiment)

In the first embodiment described in the foregoing, a case is considered wherein an excimer laser gas containing a halogen gas is used, but the present invention is not limited thereto or thereby. The present invention can also be more widely applied to a fluorine laser or any of various kinds of ultraviolet laser apparatus for an excimer laser gas that does not contain a halogen gas.

The known ultraviolet lasers for use in semiconductor exposure include such representative examples as KrF (248 nm), ArF (193 nm), $F_2$ (157 nm), $Kr_2$ (146 nm), and $Ar_2$ (126 nm), but in the case also of any of these ultraviolet lasers, the burst phenomenon and spike phenomenon can be reduced by adding xenon gas.

Figure 7:
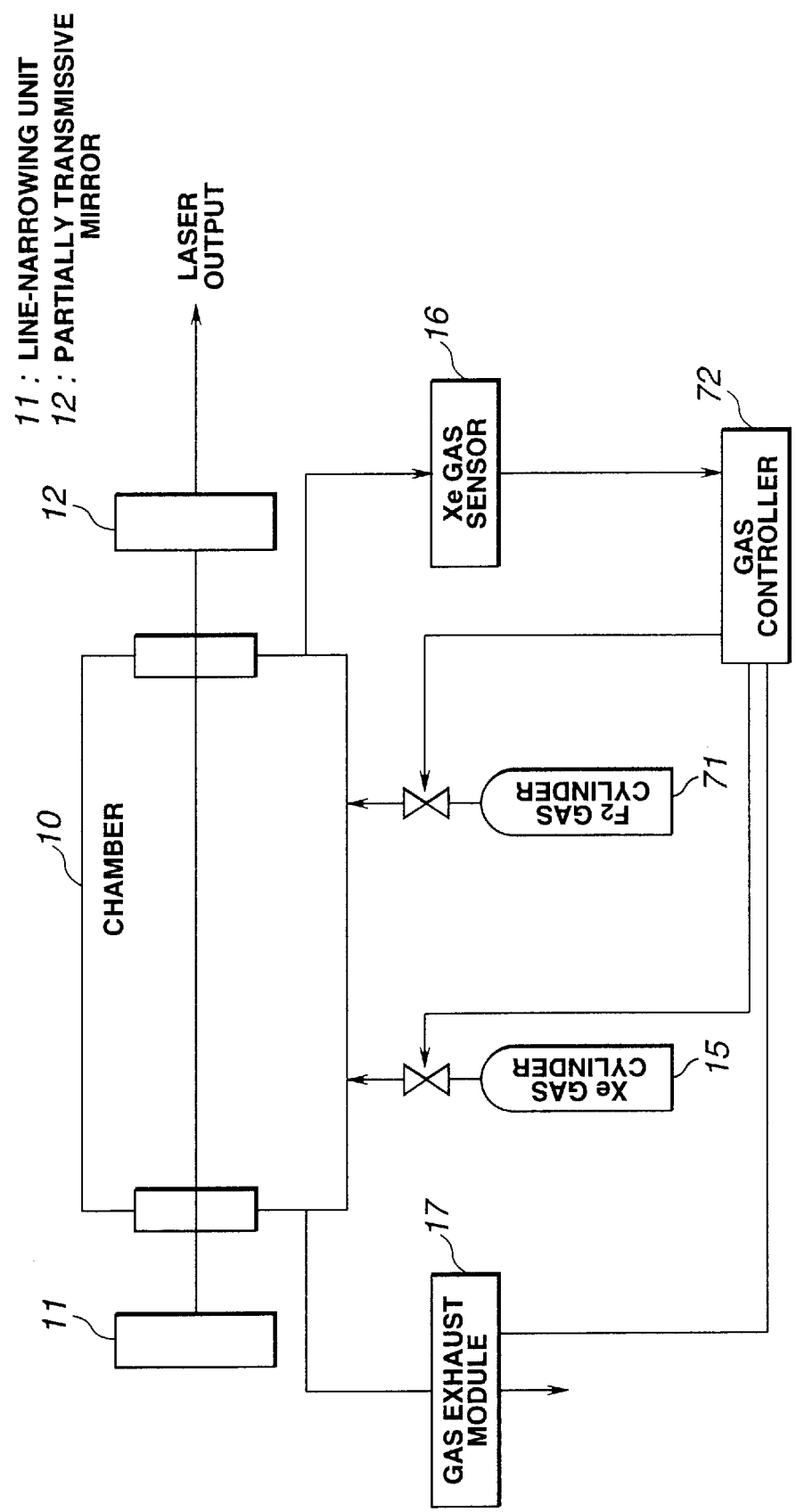
FIG. 7 is a block diagram representing the configuration of an $F_2$ laser apparatus used in a second embodiment.

FIG. 7 is a block diagram representing the configuration of an $F_2$ laser apparatus used in a second embodiment. The components therein having the same function as the components configuring the excimer laser apparatus diagrammed in FIG. 1 are indicated by the same symbols and no detailed description thereof is given here.

The $F_2$ laser apparatus diagrammed in FIG. 7 is an apparatus for oscillating laser pulses by sealing an $F_2$ laser gas inside a chamber 10 and exciting that $F_2$ laser gas by electrical discharges between discharge electrodes.

What is characteristic of the $F_2$ laser apparatus described here is that it does not form the gas for ultraviolet laser only of $F_2$ gas but adds xenon gas to that $F_2$ gas. The reason for adding the xenon gas to the gas for ultraviolet laser is that thereby the burst phenomenon and spike phenomenon appearing in ultraviolet laser outputs might be cancelled out.

The $F_2$ laser apparatus diagrammed in FIG. 7 has a chamber 10, a line-narrowing unit 11, a partially transmissive mirror 12, an $F_2$ gas cylinder 71, an Xe gas cylinder 15, an Xe gas sensor 16, a gas exhaust module 17, and a gas controller 72.

Here, the $F_2$ gas cylinder 71 is a small gas cylinder for storing fluorine gas that forms the main part of the gas for ultraviolet laser. The gas controller 72 is a controller for controlling the supply quantity of the $F_2$ gas supplied to the chamber 10 from the $F_2$ gas cylinder 71 and the quantity of xenon gas supplied to the chamber 10 from the Xe gas cylinder 15, etc., based on the detection outputs of the Xe gas sensor 16.

Thus, in this $F_2$ laser apparatus, the small Xe gas cylinder 15 is added to a conventional $F_2$ laser apparatus, in a configuration wherein the xenon gas proportion is detected by the Xe gas sensor 16, and the supply of xenon gas that is supplied to the chamber 10 from the Xe gas cylinder 15 is controlled by the gas controller 72.

As a result, the same benefits are realized as those described for the first embodiment with reference to FIGS. 2(a) to 6. More specifically, these benefits are (1) that the burst phenomenon and spike phenomenon appearing in $F_2$ laser outputs can be reduced, (2) that the $F_2$ laser output can be stabilized in a simple manner without involving complex control, and (3) that $F_2$ laser output can be stabilized using a conventional $F_2$ laser apparatus as the basic configuration.

A case has here been described wherein the present invention is applied to an $F_2$ laser apparatus, but like results are obtained when the present invention is applied to an excimer laser apparatus not comprising a halogen gas.

A case is now considered wherein burst operations are conducted using a newly assembled or reassembled chamber. On the surface of the inner walls of that newly assembled or reassembled chamber, no highly absorbent gas such as xenon gas has yet been absorbed. That being so, when a sufficient amount of xenon gas is newly supplied to the inside of that chamber so that a prescribed concentration thereof is attained, most of that supplied xenon gas will end up being adsorbed on the surface of the walls inside the chamber. Therefore, when the concentration of the gas supplied inside the chamber is measured, there will be almost no xenon gas added to the laser gas, wherefore the prescribed concentration cannot be obtained, which constitutes a problem. As a consequence, a condition will ensue wherein the laser output is not stabilized, a condition which will continue until sufficient gas has been supplied to the inside of the chamber so that gas will no longer be able to be adsorbed on the surface of the walls inside the chamber.

Accordingly, when a newly assembled or reassembled chamber has been used, the xenon gas concentration in the initial stage of use does not reach the prescribed concentration, wherefore it has not been possible to reduce the burst phenomenon and spike phenomenon appearing in the ultraviolet laser outputs when conducting burst operations. The embodiment described next resolves the problems cited above by causing xenon gas to be adsorbed beforehand in a newly assembled or reassembled chamber.

That is, if sufficient xenon gas is made to be adsorbed on the surface of the walls inside the chamber beforehand, the quantity of xenon gas corresponding to the prescribed concentration supplied later will no longer be adsorbed on the surface of the walls inside the chamber, and the xenon gas inside the chamber will reach the prescribed concentration. An ultraviolet laser apparatus is hereBelow described wherein an ArF excimer laser is supposed wherein the effects of xenon gas addition are exhibited in a particularly pronounced way.

Figure 8:
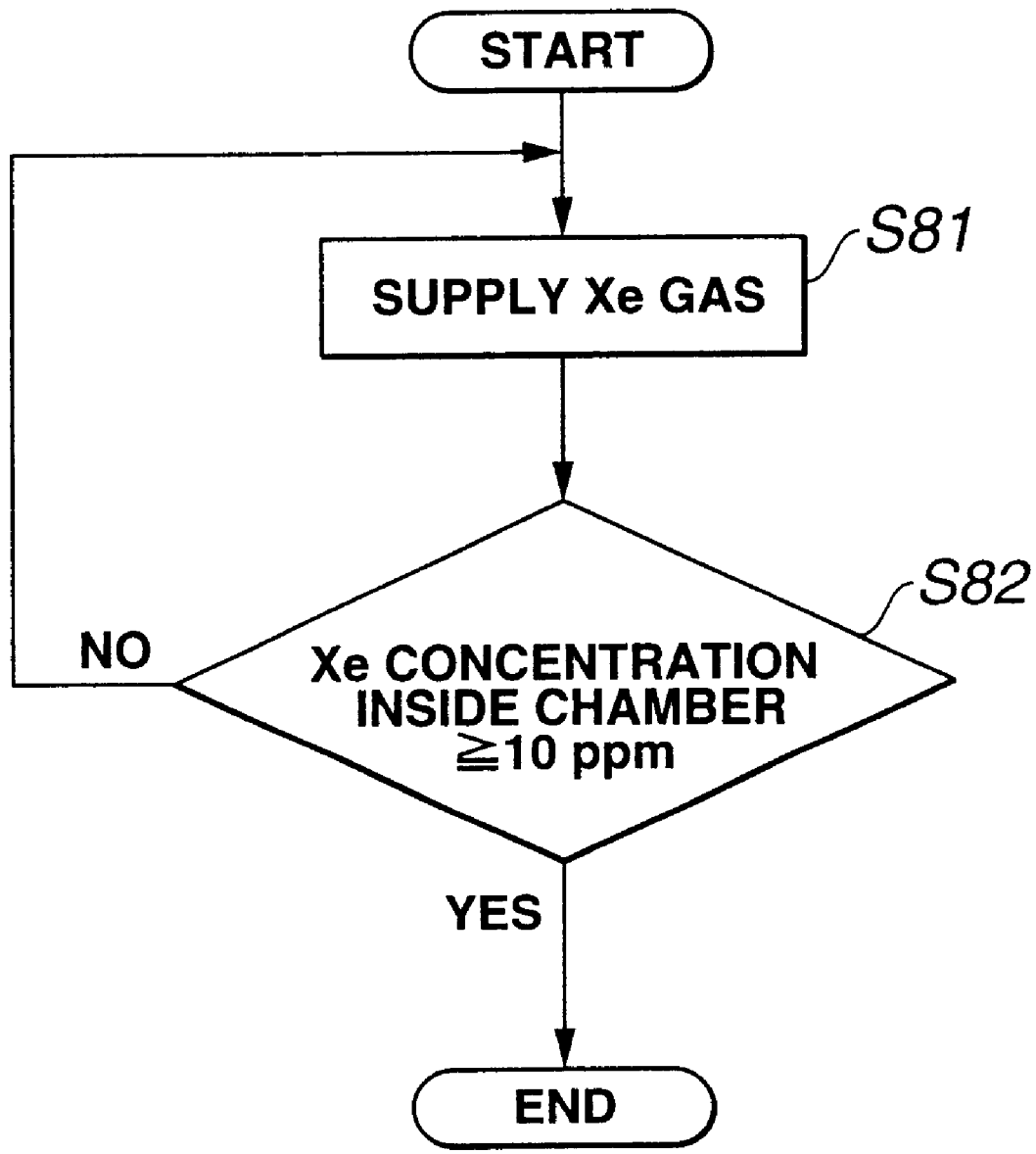
FIG. 8 is a flow chart of processing procedures assuming the configuration diagrammed in FIG. 1.

FIG. 8 is a flow chart of processing procedures presupposing the configuration diagrammed in FIG. 1. It is assumed here that the chamber 10 has been either newly assembled or reassembled.

As diagrammed in FIG. 8, xenon gas is made to be adsorbed beforehand on the surface of the walls inside the chamber 10, and the xenon gas concentration inside the chamber 10 is brought to a prescribed concentration.

More specifically, as diagrammed in FIG. 8, xenon gas is supplied from the Xe gas cylinder 15 to the inside of the chamber 10 wherein xenon gas is not adsorbed (step S81). Next, the xenon gas concentration inside the chamber 10 is measured by the Xe gas sensor 16. If the measured value equals or is higher than the prescribed concentration, the supply of xenon gas from the Xe gas cylinder 15 is stopped by the gas controller 18. The prescribed concentration is assumed here to be 10 ppm, and the same assumption is made below (step S82). This having been done, xenon gas adsorption processing ends.

The supply of the xenon gas (step S81) is now described more specifically. In a first method for supplying xenon, 100% xenon gas (the undiluted xenon gas in the gas cylinder) is supplied to the inside of the chamber 10, then, after exhausting that xenon gas, laser gas ($F_2$, Ar, Ne gas mixture) containing 10 ppm xenon gas or a buffer gas (Ne or He) containing 10 ppm xenon gas, or some other gas containing 10 ppm xenon gas is supplied to the inside of the chamber 10. If the xenon gas concentration inside the chamber 10 has reached 10 ppm, the xenon gas adsorption process is terminated. If the xenon gas concentration inside the chamber 10 has not reached 10 ppm, however, the operation is repeated, that is, the gas inside the chamber 10 is exhausted and 100% xenon gas is again supplied to the inside of the chamber 10, whereupon, after exhausting that xenon gas, gas containing 10 ppm xenon gas is supplied to the inside of the chamber 10 and an observation is made to see whether or not 10 ppm has been reached.

In a second method for supplying xenon, while performing the operation described above, wherein laser gas ($F_2$, Ar, Ne gas mixture) containing 10 ppm xenon gas or a buffer gas (Ne or He) containing 10 ppm xenon gas, or some other gas containing 10 ppm xenon gas is supplied to the inside of the chamber 10 and then exhausted, that operation is continued until the xenon gas concentration inside the chamber 10 does reach 10 ppm. In this case, after supplying a gas containing 10 ppm xenon to the inside of the chamber 10, if upon measuring the xenon gas concentration it is found not to have reached 10 ppm, the inside of the chamber 10 is exhausted, whereupon it is possible to repeat the operation whereby a gas containing 10 ppm xenon is repeatedly supplied to the inside of the chamber 10 until the xenon gas concentration inside the chamber 10 does reach 10 ppm.

By performing the process described in the foregoing, xenon gas will be adequately adsorbed on the inside of the chamber 10, and the xenon gas supplied thereafter in a quantity corresponding to a prescribed concentration will be added to the laser gas without being adsorbed on the surface of the walls inside the chamber. The concentration of the xenon gas inside the chamber will therefore attain the prescribed concentration (10 ppm). As a result, even when a newly assembled or reassembled chamber is used, the xenon gas concentration will attain the prescribed concentration in the initial stage of use, and, when conducting burst operations, the burst phenomenon and spike phenomenon appearing in the ultraviolet laser output can be reduced.

An embodiment is described next wherewith the xenon gas concentration can be accurately measured without using the Xe gas sensor 16.

Figure 9A:
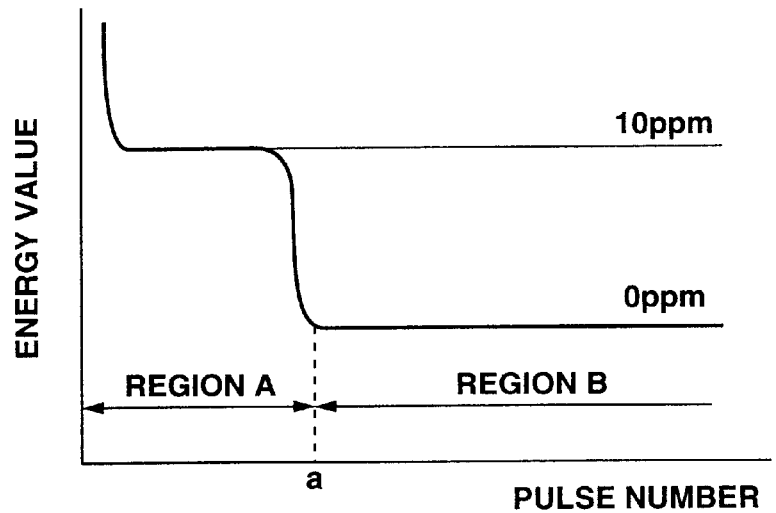
FIGS. 9(a) and 9(b) are diagrams representing the spike characteristics of an ArF excimer laser.
Figure 9B:
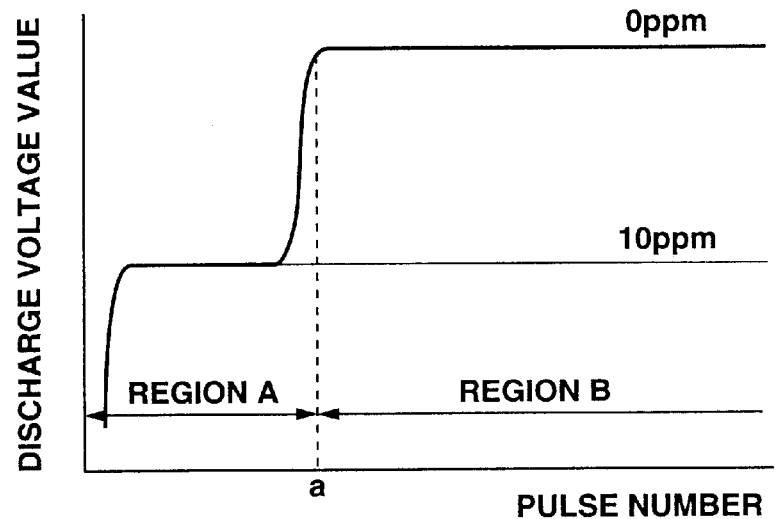

FIGS. 9(a) and 9(b) are a pair of diagrams representing the spike characteristics of an ArF excimer laser. In FIG. 9(a), the energy value is plotted on the vertical axis and the pulse number on the horizontal axis. In FIG. 9(b), the discharge voltage value is plotted on the vertical axis and the pulse number on the horizontal axis. The region from the first pulse to the pulse a is called region A, and the region following pulse a is called region B.

As indicated in FIG. 9(a), when the laser excitation strength is constant, the ArF excimer laser energy value declines precipitously in region A, and then stabilizes at a constant value. In region B, the energy value does not change when the xenon gas concentration inside the chamber is 10 ppm. When the xenon gas concentration inside the chamber is 0 ppm, on the other hand, the energy value decreases further at the time when pulse a is reached, and then stabilizes at a constant value.

As indicated in FIG. 9(b), meanwhile, the discharge voltage value needed to sustain the light energy of each pulse output from the laser of an ArF excimer laser constant very rapidly increases in region A and then stabilizes at a constant value. In region B, the discharge voltage value does not change when the xenon gas concentration inside the chamber is 10 ppm. When the xenon gas concentration is 0 ppm, however, the energy value increases further at the time that pulse a is reached, and then stabilizes at a constant value.

Accordingly, at the time of pulse a, if either the decrease in the laser 10 energy value has ceased or the increase in the discharge voltage value has ceased, it can be judged that the xenon gas concentration has reached 10 ppm.

Figure 10:
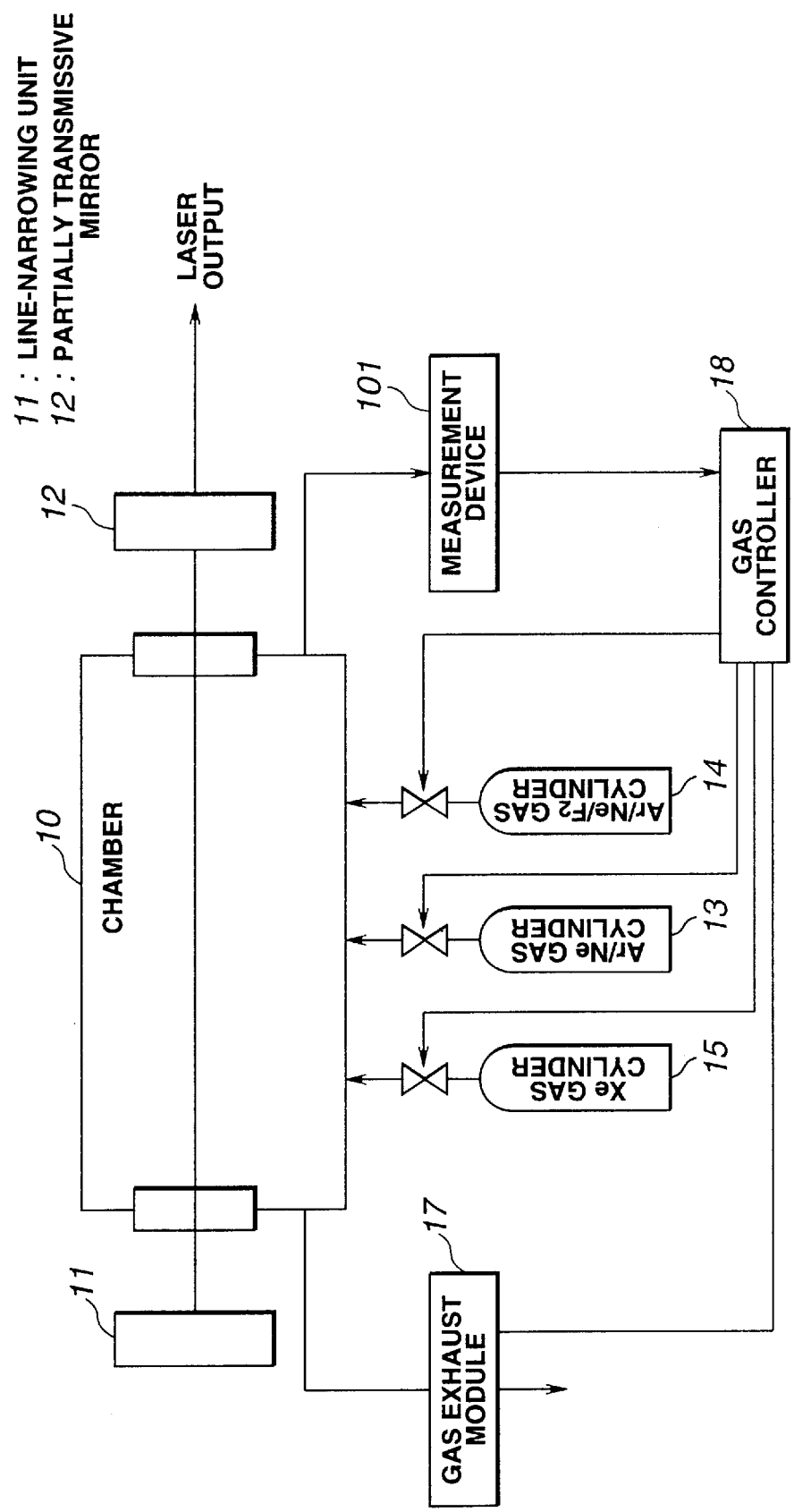
FIG. 10 is a diagram of the configuration of an embodiment wherein xenon gas is made to be adsorbed on the surface of walls inside a chamber 10 beforehand, using the characteristics plotted in FIGS. 9(a) and 9(b)

In FIG. 10 is diagrammed the configuration of an embodiment wherein xenon gas is made to be absorbed beforehand on the surface of the walls inside the chamber 10, using the characteristics plotted in FIGS. 9(a) and 9(b). FIG. 10 is a block diagram of the configuration of an ArF excimer laser apparatus. Those components therein having the same function as the configuring components in the excimer laser apparatus diagrammed in FIG. 1 are designated by the same symbols and no detailed description thereof is given here.

In the ArF excimer laser apparatus, as diagrammed in FIG. 10, a measurement device 101 for measuring either energy values or discharge voltage values is provided in place of the Xe gas sensor 16 diagrammed in FIG. 1. In other words, either the discharge voltage values of the discharge electrodes inside the chamber 10 or the energy values of the laser light emitted from the chamber 10 are measured for every pulse by the measurement device 101. The energy values or discharge voltage values measured by the measurement device 101 are input to the gas controller.

Figure 11:
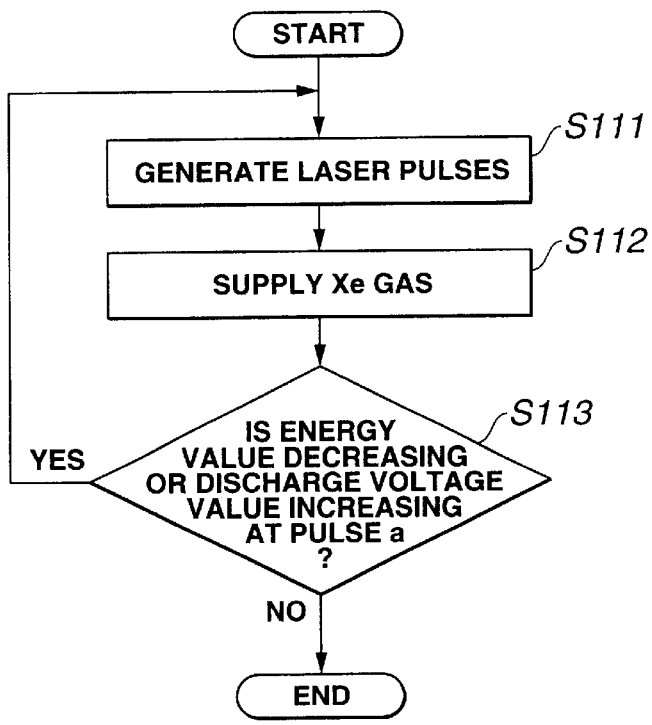
FIG. 11 is a flow chart of process procedures performed by a gas controller 18.

FIG. 11 is a flow chart of the processing procedures performed by the gas controller 18, where it is assumed that the chamber 10 used is either newly assembled or reassembled.

Xenon gas adsorption processing is conducted as diagrammed in FIG. 11. The content of that xenon gas adsorption processing is indicated in steps S111 to S113. More specifically, an $F_2$, Ar, Ne gas mixture having mixture proportions for actually performing laser oscillation is supplied to the inside of the chamber 10, and laser pulse oscillation is performed in a burst mode (step S111). Xenon gas is supplied to the inside of the chamber 10 wherein the xenon gas from the Xe gas cylinder 15 is not adsorbed (step S112). Next, the laser energy value or discharge voltage value is measured by the measurement device 101. The processing described in the foregoing (steps S111 to S113) is repeated until it can be verified that, at the time of pulse a, either the decrease in the laser energy value has ceased or the increase in the discharge voltage value has ceased. When it is verified that, at the time of pulse a, either the decreasing of the laser energy value has ceased or the increasing of the discharge voltage value has ceased, it is judged that the xenon gas concentration inside the chamber 10 has reached 10 ppm, and the supply of xenon gas from the Xe gas cylinder 15 is stopped by the gas controller 18 (step S113). When this has been done the xenon gas adsorption process ends.

In another method of xenon gas adsorption processing, a gas (hereinafter called "LG") produced by adding 10 ppm xenon gas to the $F_2$, Ar, Ne gas mixture having the mixture proportions for actually conducting laser oscillation is first supplied to the inside of the chamber 10 and a laser is oscillated in pulses. As soon as it is verified that, at the a'th pulse, either the laser output energy value has ceased declining, or the discharge voltage value has ceased increasing, the gas inside the chamber 10 is exhausted, the gas LG is again supplied and laser pulses are oscillated, and the process described above can be repeated until it is no longer verified at the a'th pulse that the laser output energy value is decreasing or that the discharge voltage value is increasing.

Furthermore, when control is effected to make the discharge voltage constant, a portion of the laser output light is input to a photosensor and changes in the energy value are measured by the measurement device 101. And when control is effected to make the energy constant, changes in the discharge voltage value are measured by the measurement device 101.

The xenon gas adsorption process described in the foregoing may also be performed when the phenomena diagrammed in FIGS. 9(a) and 9(b) are observed during exposure.

As a consequence thereof, even when a newly assembled or reassembled chamber 10 is used, when the xenon gas concentration attains the prescribed concentration in the initial stage of use and burst operations are being conducted, the burst phenomenon and spike phenomenon appearing in the ultraviolet laser output can be reduced. As based on this embodiment, moreover, there is no need to provide the Xe gas cylinder 16, wherefore the apparatus configuration can be simplified and the concentration still accurately measured.

Now, when a newly assembled or reassembled chamber 10 is used, impurities such as water or oxygen are deposited on the surface of the walls inside the chamber 10. Hence it is necessary to remove these impurities by so-called passivation. Specifically, with an ArF excimer laser, usually ArF gas or KrF gas is supplied to the inside of the chamber 10, and a chemical reaction is induced between the impurities and the gas, whereupon the impurities are removed, and a fluoride film is formed on the surface of the walls inside the chamber 10. This is process is called passivation. The passivation treatment renders the surface of the walls inside the chamber 10 in a stable condition relative to fluorine.

Figure 12:
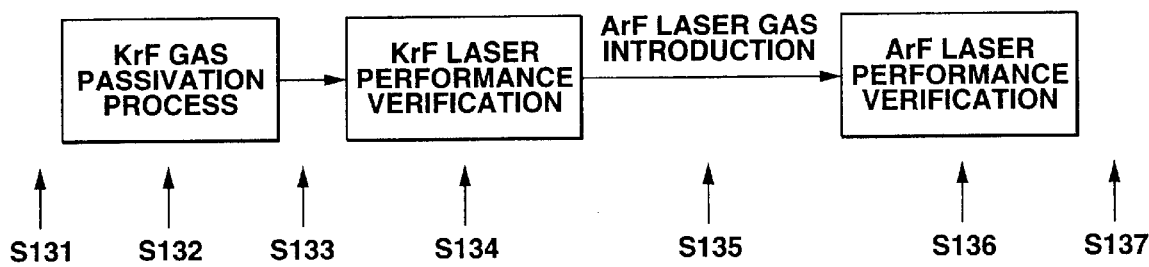
FIG. 12 is a diagram of a process for subjecting the surface of the walls inside an ArF excimer laser chamber 10 to a passivation treatment using KrF gas.

FIG. 12 is a diagram of a process for subjecting the surface of the walls inside an ArF excimer laser chamber 10 to a passivation treatment using KrF.

As diagrammed in FIG. 12, first the surface of the walls inside the chamber 10 is subjected to a passivation process using KrF gas. Next a process is done to verify KrF excimer laser performance. Next, an ArF excimer laser gas is introduced into the chamber 10, and a process is done to verify ArF excimer laser performance.

The process here of supplying the xenon gas to the inside of the chamber 10 can be performed prior to the passivation treatment using KrF gas, as indicated by the arrow S131. Or that xenon gas supplying process can be performed simultaneously with the passivation treatment using KrF gas, as indicated by the arrow S132. Alternatively, the xenon gas supplying process can be performed between the passivation treatment using KrF gas and the process of verifying KrF excimer laser performance, as indicated by the arrow S133. Or the xenon gas supplying process can be performed simultaneously with the process of verifying KrF excimer laser performance, as indicated by the arrow S134. Alternatively, the xenon gas supplying process can be performed between the process of verifying KrF laser performance and the process of verifying ArF laser performance, as indicated by the arrow S135. Or the xenon gas supplying process can be done simultaneously with the process of verifying ArF laser performance, as indicated by the arrow S136. Alternatively, the xenon gas supplying process can be performed after the process of verifying ArF laser performance, as indicated by the arrow S137.

According to FIG. 12, a passivation process is performed on the surface of the walls inside the chamber 10 using KrF gas and a process is performed to verify KrF excimer laser performance, but these processes that use KrF gas may be omitted. That is, after a passivation treatment is performed on the surface of the walls inside the chamber 10 using ArF gas, a process is performed to verify ArF excimer laser performance. When this is the case, however, there is a danger that the discharge electrodes and other components inside the chamber 10 will become worn so that the useful life of the chamber is shortened. There is a further danger that laser pulse oscillation will cease to stabilize. This being so, it is preferable that KrF gas be used in performing the passivation process on the surface of the walls inside the chamber 10.

What is claimed is:

1. An ultraviolet laser apparatus having gas for ultraviolet laser sealed inside a ultraviolet laser chamber, and means for exciting the gas for ultraviolet laser by effecting, pulse discharges inside the chamber to oscillate a pulsed laser, wherein xenon gas is supplied to inside the chamber while quantity and concentration of the supplied xenon gas is controlled to reduce burst and spike phenomena appearing in ultraviolet laser output, comprising:

xenon gas adsorption means for causing xenon gas to be adsorbed in the chamber wherein xenon gas has not been adsorbed on surface of walls thereof, and verification means for verifying that concentration of xenon gas inside the chamber has a concentration when the xenon gas absorption means have caused xenon gas to be adsorbed on the surface of the walls inside the chamber, and the xenon gas has been supplied in such quantity that concentration of xenon gas inside the chamber will reach the concentration.

2. The ultraviolet laser apparatus according to claim 1, wherein the concentration of the xenon gas inside the chamber exceeds 0 ppm but is no greater than 200 ppm.

3. The ultraviolet laser apparatus according to claim 1, wherein:

the xenon gas absorption means comprises xenon gas supply means for supplying xenon gas to inside of the chamber, and the verification means comprises concentration measurement means for measuring the concentration of the xenon gas inside the chamber, wherein supply of the xenon gas by the xenon gas supply means is stopped when the concentration of the xenon gas inside the chamber as measured by the concentration measurement means has reached a desired concentration.

4. The ultraviolet laser apparatus according to claim 1, wherein:

the xenon gas adsorption means comprises xenon gas supply means for supplying the xenon gas to inside of the chamber, and the verification means comprises energy measurement means for measuring laser energy value when laser pulses are oscillated, wherein the xenon gas is supplied to inside of the chamber by the xenon gas supply means and laser pulses are oscillated, laser energy values before and after a number of pulses has been oscillated is measured by the energy measurement means, and the supply of the xenon gas by the xenon gas supply means is stopped when laser energy value after the number of pulses has been oscillated has ceased to decrease.

5. The ultraviolet laser apparatus according to claim 1, wherein:

the xenon gas adsorption means comprises xenon gas supply means for supplying the xenon gas to inside of the chamber, and the verification means comprises voltage measurement means for measuring discharge voltage value when laser pulses are oscillated, wherein the xenon gas is supplied to inside of the chamber by the xenon gas supply means and laser pulses are oscillated, the discharge voltage values before and after a number of pulses has been oscillated is measured by the voltage measurement means, and, when the discharge voltage value after the number of pulses has been oscillated has ceased to increase, the supply of the xenon gas by the xenon gas supply means is stopped.

6. The ultraviolet laser apparatus according to claim 1, wherein:

the xenon gas adsorption means comprises flushing means for flushing inside of the chamber with the xenon gas, and the verification means comprises supply means for supplying the xenon gas to inside of the chamber and measurement means for measuring concentration of xenon gas inside the chamber, wherein when a quantity of xenon gas has been supplied by the supply means, flushing is repeatedly performed by the flushing means until concentration of the xenon gas inside the chamber as measured by the measuring means reaches the concentration.

7. The ultraviolet laser apparatus according to claim 6, wherein the flushing by the flushing means is performed either while, before or after the surface of the walls inside the chamber is subjected to a passivation process for the gas for ultraviolet laser.

8. A method of adsorbing xenon in a ultraviolet laser chamber having an inner wall surface, comprising:

a gas exhausting step of exhausting gases inside the ultraviolet laser chamber;

a xenon supplying and adsorbing step of supplying xenon gas to inside the ultraviolet laser chamber and having the xenon gas adsorbed onto the inner wall surface of the chamber;

a xenon supply stopping step of stopping supply of the xenon gas to inside the ultraviolet laser chamber; and a verifying step of verifying adsorption of the xenon onto the inner wall surface of the chamber and concentration of the xenon in the chamber, wherein the gas exhausting step, the xenon supplying and adsorbing step, the xenon supply stopping step and the verifying step are repeatedly performed until the xenon concentration inside the chamber reached a desired concentration.

9. An ultraviolet laser apparatus having gas for ultraviolet laser sealed inside a chamber, and means for exciting the gas for ultraviolet laser by effecting pulse discharges inside the chamber to oscillate a pulsed laser, including:

means for maintaining xenon gas at a concentration at about 30 ppm or lower inside the chamber and in an amount sufficient for reducing burst and spike phenomena appearing in ultraviolet laser output, including a separate xenon gas cylinder for supplying the xenon gas to the chamber;

xenon gas compensation means for replenishing xenon gas adsorbed in the chamber including wall surfaces of the chamber; and verification means for verifying that concentration of xenon gas inside the chamber has stabilized at the concentration at about 30 ppm or lower of the xenon gas and in an amount sufficient for reducing burst and spike phenomena appearing in ultraviolet laser output within the chamber.

* * * * *